US011756553B2

(12) United States Patent
Freed et al.

(10) Patent No.: US 11,756,553 B2
(45) Date of Patent: Sep. 12, 2023

(54) TRAINING DATA ENHANCEMENT

(71) Applicant: International Business Machines Corporation, Armonk, NY (US)

(72) Inventors: Andrew R. Freed, Cary, NC (US); Aaron T. Smith, Raleigh, NC (US); Ryan Brink, Raleigh, NC (US); Vamshi Krishna Thotempudi, San Jose, CA (US); Jasmeet Singh, Apex, NC (US); Marco Noel, Quebec (CA)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 17/023,535

(22) Filed: Sep. 17, 2020

(65) Prior Publication Data
US 2022/0084526 A1 Mar. 17, 2022

(51) Int. Cl.
| | |
|---|---|
| G10L 17/04 | (2013.01) |
| G10L 15/19 | (2013.01) |
| G06N 20/00 | (2019.01) |
| G10L 17/08 | (2013.01) |
| G06F 18/22 | (2023.01) |
| G06F 18/214 | (2023.01) |

(52) U.S. Cl.
CPC ............ *G10L 17/04* (2013.01); *G06F 18/214* (2023.01); *G06F 18/22* (2023.01); *G06N 20/00* (2019.01); *G10L 15/19* (2013.01); *G10L 17/08* (2013.01)

(58) Field of Classification Search
CPC ......... G10L 17/04; G10L 15/19; G06N 20/00; G06K 9/6215; G06K 9/6256
See application file for complete search history.

(56) References Cited

U.S. PATENT DOCUMENTS

| | | | |
|---|---|---|---|
| 8,515,736 B1 | 8/2013 | Duta | |
| 8,781,813 B2 | 7/2014 | Cooper et al. | |
| 9,292,492 B2 | 3/2016 | Sarikaya et al. | |
| 9,424,233 B2 | 8/2016 | Barve et al. | |
| 10,304,442 B1 * | 5/2019 | Rudden | G06N 20/00 |
| 10,305,826 B1 | 5/2019 | White et al. | |
| 10,452,782 B1 * | 10/2019 | Kumar | G06F 40/295 |
| 10,497,366 B2 | 12/2019 | Sapugay et al. | |
| 10,600,406 B1 * | 3/2020 | Shapiro | G10L 15/22 |

(Continued)

OTHER PUBLICATIONS

"Cluster Analysis", From Wikipedia, The Free Encyclopedia, This page was last edited on Jul. 7, 2020, 23 pages, <https://en.wikipedia.org/wiki/Cluster_analysis>.

(Continued)

*Primary Examiner* — Michael N Opsasnick
(74) *Attorney, Agent, or Firm* — Randy Tejeda

(57) ABSTRACT

In an approach for training data enhancement for an interactive response system, a processor retrieves a set of training data including a set of intents, a set of entities, and a set of utterances that map to each intent. A processor determines iteratively a root verb among the set of utterances for each intent. A processor to determine a set of new intents based on analysis of the determined root verb by performing a pairwise iteration and similarity score over the set of intents. A processor determines iteratively one or more new entities for each new intent. A processor generates a set of new training data based on the set of new intents and entities.

20 Claims, 4 Drawing Sheets

(56) References Cited

U.S. PATENT DOCUMENTS

| | | | | |
|---|---|---|---|---|
| 2007/0073678 | A1* | 3/2007 | Scott | G06F 16/374 |
| | | | | 707/999.005 |
| 2014/0303961 | A1* | 10/2014 | Leydon | G06F 40/51 |
| | | | | 704/2 |
| 2015/0073798 | A1* | 3/2015 | Karov | G06F 16/36 |
| | | | | 704/243 |
| 2017/0011068 | A1* | 1/2017 | Vashishtha | G06F 16/9535 |
| 2018/0365228 | A1 | 12/2018 | Galistsky | |
| 2019/0102078 | A1* | 4/2019 | Bhatt | G06F 3/0481 |
| 2019/0103095 | A1* | 4/2019 | Singaraju | G06N 5/003 |
| 2019/0132264 | A1 | 5/2019 | Ali et al. | |
| 2019/0140986 | A1 | 5/2019 | Anderson et al. | |
| 2019/0188317 | A1 | 6/2019 | Kashyap et al. | |
| 2019/0251417 | A1 | 8/2019 | Bennett et al. | |
| 2019/0294925 | A1* | 9/2019 | Kang | G06N 3/045 |
| 2019/0377790 | A1 | 12/2019 | Redmond et al. | |
| 2019/0377794 | A1 | 12/2019 | Li et al. | |
| 2020/0005157 | A1* | 1/2020 | Rosenstein | G06N 20/00 |
| 2020/0082813 | A1* | 3/2020 | Rudden | G06N 5/022 |
| 2021/0081615 | A1* | 3/2021 | McRitchie | G06F 40/247 |
| 2021/0082410 | A1* | 3/2021 | Teserra | G10L 15/1815 |
| 2021/0397796 | A1* | 12/2021 | Dounis | G06F 40/232 |
| 2022/0051665 | A1* | 2/2022 | Bade | G06F 16/284 |

OTHER PUBLICATIONS

"Code Archive word2vec", Google Code Archive—Long-term storage for Google Code Project Hosting, Printed Aug. 3, 2020, 7 pages, <https://code.google.com/archive/p/word2vec/>.

"Cognitive-catalyst / WA-Testing-Tool", GitHub—cognitive-catalyst/WA-Testing-Tool: Scripts that run again, Printed Jul. 29, 2020, 6 pages, <https://github.com/cognitive-catalyst/WA-Testing-Tool>.

"Cosine Similarity", Wikipedia, The Free Encyclopedia, This page was last edited on Jul. 11, 2020, 6 pages, <https://en.wikipedia.org/wiki/Cosine_similarity>.

Guo et al., "Conversational Bootstrapping and Other Tricks of a Concierge Robot", Mar. 2017, DOI: 10.1145/2909824.3020232, 10 pages, <https://www.researchgate.net/publication/314164238_Conversational_Bootstrapping_and_Other_Tricks_of_a_Concierge_Robot>.

Mahgoub et al., "SIMVECS: Similarity-Based Vectors For Utterance Representation In Conversational AI Systems", Proceedings of the 23rd Conference on Computational Natural Language Learning, Nov. 3-4, 2019, Hong Kong, China, , pp. 708-717.

Mell et al., "The NIST Definition of Cloud Computing", Recommendations of the National Institute of Standards and Technology, Special Publication 800-145, Sep. 2011, 7 pages.

Sacchi, Alessia, "Entities and Intents: crawling through Natural Language Processing", RedThunder.Blog, Jul. 29, 2017, 8 pages, <https://redthunder.blog/2017/07/29/entities-and-intents-crawling-through-natural-language-processing/>.

Seipel et al., "Speak to Your Software Visualization—Exploring Component-Based Software Architectures In Augmented Reality With a Conversational Interface", Proceedings of the Seventh Working Conference on Software Visualization (VISSOFT), Sep. 30-Oct. 1, 2019, Cleveland, Ohio, 5 pages.

Vedula et al., "Towards Open Intent Discovery For Conversational Text", arXiv:1904.08524v1, Apr. 17, 2019, 11 pages.

Wang et al., "Mining user Intents In Twitter: A Semi-Supervised Approach to Inferring Intent Categories For Tweets", Proceedings of the Twenty-Ninth AAAI Conference on Artificial Intelligence, Jan. 25-30, 2015, Austin Texas, 7 pages.

\* cited by examiner

TRAINING DATA ENHANCEMENT

BACKGROUND

The present disclosure relates generally to the field of machine learning, and more particularly to enhancing training data for a chatbot system.

Machine learning is an artificial intelligence field that focuses on making machines learn. Machine learning is about finding ways to make machines do something better over time by learning. Learning can be done by looking at past mistakes, inputting more data, brute force, and more. In a chatbot environment, machine learning is often used to power parts of a chatbot's abilities. Machine learning may improve a chatbot's ability to answer complex user queries over time. Machine learning may train a recommendation engine that users query when talking to the bot. A chatbot may be a software application used to conduct an on-line chat conversation via text or text-to-speech, in lieu of providing direct contact with a live human agent. A chatbot system may require continuous tuning and testing.

SUMMARY

Aspects of an embodiment of the present disclosure disclose an approach for training data enhancement for an interactive response system. A processor retrieves a set of training data including a set of intents, a set of entities, and a set of utterances that map to each intent. A processor determines iteratively a root verb among the set of utterances for each intent. A processor to determine a set of new intents based on analysis of the determined root verb by performing a pairwise iteration and similarity score over the set of intents. A processor determines iteratively one or more new entities for each new intent. A processor generates a set of new training data based on the set of new intents and entities.

DETAILED DESCRIPTION

The present disclosure is directed to systems and methods for training data enhancement for an interactive response system (e.g., a chatbot system).

Embodiments of the present disclosure recognize a need for scoring a chatbot's training and making suggestions based on the use of intents and entities. Embodiments of the present disclosure recognize a need for maintaining differentiation provided by an initial training data while optimizing the way utterances are routed in a chatbot dialog. Embodiments of the present disclosure disclose performing an evidence-based analysis of a chatbot's existing training data and identifying opportunities for improvement by identifying intents that can be refactored into intents with entities. Embodiments of the present disclosure disclose taking utterances that a user intends to route differently in the chatbot and optimizing the use of intents and entities to do that routing. Embodiments of the present disclosure disclose maintaining and improving a testing score (e.g., a k-fold score) of a training data set with the intention of increasing a blind score by being more generalizable and less confusable. Embodiments of the present disclosure disclose improving training data by moving from more intents/few entities to less intents/more entities.

Figure 1:
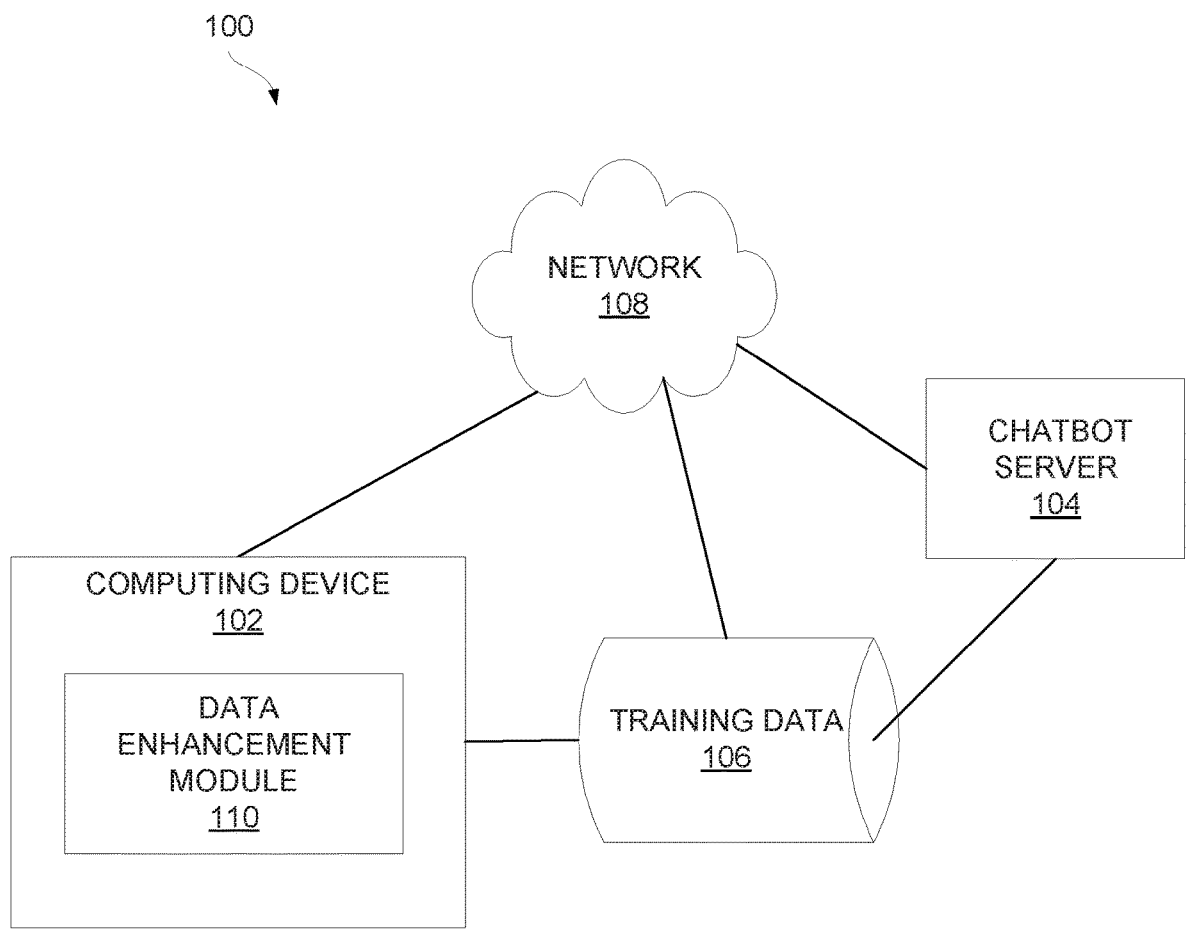
FIG. 1 is a functional block diagram illustrating a training data enhancement environment, in accordance with an embodiment of the present disclosure.

The present disclosure will now be described in detail with reference to the Figures. FIG. 1 is a functional block diagram illustrating a training data enhancement environment, generally designated 100, in accordance with an embodiment of the present disclosure.

In the depicted embodiment, training data enhancement environment 100 includes computing device 102, chatbot server 104, training data 106, and network 108. Chatbot server 104 may be a management server, a web server, or any other electronic device or computing system capable of processing program instructions and receiving and sending data. In some embodiments, chatbot server 104 may be a laptop computer, a tablet computer, a netbook computer, a personal computer (PC), a desktop computer, or any programmable electronic device. In other embodiments, chatbot server 104 may represent a server computing system utilizing multiple computers as a server system, such as in a cloud computing environment. In another embodiment, chatbot server 104 represents a computing system utilizing clustered computers and components to act as a single pool of seamless resources. Chatbot server 104 may include internal and external hardware components, as depicted and described in further detail with respect to FIG. 4. In one or more embodiments, chatbot server 104 may be a computing system that provides a conversational interface that may mimic chatting with a real human. A chatbot may be a common form of conversational interfaces. A chatbot may be a computer program designed to simulate conversation with human users, especially over the Internet. A chatbot may need to understand intents and entities of user queries, e.g., utterances.

In one or more embodiments, training data 106 is data provided to train a learning model for chatbot server 104. For example, training data 106 can be data D (D1, D2, . . . , Dn) with entries E (E1, E2, . . . , En) used to determine intents I (I1, I2, . . . , In) wherein the each training data Di is a set of utterances Ui (Ui1, Ui2, . . . , Uik). In general, an utterance may be anything a user using a chatbot says to it. An utterance may be referred to as a user input. An intent may refer to the goal the user has in mind when typing in a question or comment. An intent may refer to what the user's utterance means. An intent may be something the chatbot needs to respond to. A typical chatbot may be built on a series of intents, along with an understanding of how it needs to respond to them. An entity may refer to a modifier the user uses to describe an issue. An entity may be a variable that compliments or modifies the intent. An entity may be a snippet of information the chatbot needs to understand in order to serve a correct answer. For example, an intent may represent, for example, the purpose of the user query. An entity may represent, for example, a term or object that is relevant to the user's intent and that provides a specific context for an intent. In the depicted embodiment, training data 106 is located externally and accessed through a communication network such as network 108. Training data 106 may be accessed directly by computing device 102 and chatbot server 104. However, in other embodiments, training data 106 may be located on computing device 102 and or chatbot server 104.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to data enhancement module 110 and network 108 and is capable of processing program instructions and executing data enhancement module 110, in accordance with an embodiment of the present disclosure. Computing device 102 may include internal and external hardware components, as depicted and described in further detail with respect to FIG. 4.

Further, in the depicted embodiment, computing device 102 includes data enhancement module 110. In the depicted embodiment, data enhancement module 110 is located on computing device 102. However, in other embodiments, data enhancement module 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and data enhancement module 110, in accordance with a desired embodiment of the disclosure.

In one or more embodiments, data enhancement module 110 is configured to retrieve training data 106 from chatbot server 104. Training data 106 may include a set of intents, a set of entities, and a set of utterances for each intent that map to each intent. For example, training data 106 can be a set of training data D (D1, D2, . . . , Dn) with entities E (E1, E2, . . . , En) used to determine intents I (I1, I2, . . . , In) wherein the each training data Di is a set of utterances Ui (Ui1, Ui2, . . . , Uik) for each Ii. Data enhancement module 110 may retrieve the set of intents from the set of training data. Data enhancement module 110 may take all utterances in each intent Ii and figure out a root verb to represent the intent's utterances. Data enhancement module 110 may identify intents and entities from utterances in training data 106. Data enhancement module 110 may iteratively identify a set of utterances from the set of training data that map to each intent Ii.

In one or more embodiments, data enhancement module 110 is configured to determine a root verb among a set of utterances for each intent. Data enhancement module 110 may take all utterances associated with each intent Ij and figure out a root verb to represent the intent's utterances. Data enhancement module 110 may perform part-of-speech tagging of each utterance. In an example, part-of-speech tagging, also called grammatical tagging, may be the process of marking up a word in a text (corpus) as corresponding to a particular part of speech, based on both definition and context of the speech. Data enhancement module 110 may stem every verb in each utterance. Data enhancement module 110 may declare the root verb based on a frequency score over a pre-defined threshold. For example, data enhancement module 110 may declare a verb with highest frequency score as the root verb. The frequency score can just be "most frequent verb". When the frequency score of a verb is above a pre-defined threshold (e.g., 50% of all verbs in the intent), the verb may be selected as the root verb. If no verb scores above the threshold, data enhancement module 110 may look up word embedding vector for each verb. Data enhancement module 110 may determine the verb as the root verb that has the highest sum of the verb's word embedding vector to see which one is the most meaningful.

In one or more embodiments, data enhancement module 110 is configured to analyze iteratively (e.g., j=1 . . . n) the set of training data Dj that map to the intent Ij by determining a root verb Vj and a set of entities Ej (Ej1, Ej2, . . . , Ejm). The training data Dj may be a set of utterances Uj (Uj1, Uj2, . . . , Ujk) for each Ij. Data enhancement module 110 may count verbs in the training data Dj. Responsive to identifying a first verb exceeding a verb frequency threshold, data enhancement module 110 may determine the first verb exceeding the frequency threshold as the root verb. Responsive to identifying an absence of the first verb exceeding the verb frequency threshold, data enhancement module 110 may derive the root verb Vj from corresponding word embedding vectors. In an example, data enhancement module 110 may compute a similarity (e.g., cosine similarity) between the root verb Vj and the previous root verbs V1 . . . j−1.

In one or more embodiments, data enhancement module 110 is configured to determine a set of new intents from training data 106 based on analysis of a set of the determined root verbs by performing a pairwise iteration and similarity score over the set of intents. Data enhancement module 110 may form a new intent by determining the similarity score among two or more existing intents exceeds a pre-defined threshold. Data enhancement module 110 may keep the root verb as a new intent if the similarity score among two or more existing intents exceeds the pre-defined threshold. Data enhancement module 110 may compute a similarity (e.g., cosine similarity) between each intent's root verb. For example, cosine similarity can be a measure of similarity between two non-zero vectors of an inner product space. Cosine similarity may be defined to equal the cosine of the angle between the two non-zero vectors, which is also the same as the inner product of the same vectors normalized to both have length 1. Two vectors with the same orientation have a cosine similarity of 1, two vectors oriented at 90° relative to each other have a similarity of 0, and two vectors diametrically opposed have a similarity of −1, independent of the vectors' magnitude. Data enhancement module 110 may associate utterances mapped to the two or more existing intents with the similarity score to the new intent. Data enhancement module 110 may remove the two or more existing intents with the similarity score from the set of new intents. Responsive to completion of the pairwise iteration, data enhancement module 110 may keep the remaining intents to the set of new intents. For example, data enhancement module 110 may form a new intent NewIk if the similarity score between intents Ii and Ij exceeds a pre-defined threshold. The new intent NewIk may keep the root verb from intents Ii and Ij. NewIk may get the combined utterance set from intents Ii and Ij. Ii and Ij may be removed from the existing intent set I. After the iteration is complete, any remaining intents in the existing intent set I may be added to the new intent set NewI. In one or more embodiments, data enhancement module 110 is configured to analyze iteratively the set of training data Dj that map to the intent Ij for the root verb Vj and the set of entities Ej (Ej1, Ej2, . . . , Ejm) and utilize a first similarity scoring against the V1 . . . j−1 (V1, V2, . . . , Vj−1) to identify a new intent I'j and a second similarity scoring against the entities E1,j−1 (E1, E2, . . . , Ej−1) to identify a new entity E'j.

In one or more embodiments, data enhancement module 110 is configured to determine new entities for each new intent constructed based on training data 106. Data enhancement module 110 may remove pronouns from the set of utterances for each new intent. Data enhancement module 110 may count noun candidates for the set of utterances for each new intent. Data enhancement module 110 may build a frequency score for each noun based on how often a noun appears in the set of utterances for each new intent. Data enhancement module 110 may determine a noun with a frequency score above a pre-defined threshold as a new entity for the new intent. For example, [9,0,1] may represent a frequency score for an entity that occurs in nine utterances for NewI_1, zero in NewI_2, and once in NewI_3. In an example, a pre-defined threshold may be defined that a noun appears only in one new intent. The noun may be selected as a new entity for the new intent. In another example, a pre-defined threshold may be defined that a noun appears over a certain percentage (e.g., 75%) of time in a single new intent. The noun with the frequency score over the certain percentage of time in the single new intent may be determined as a new entity for the new intent. Data enhancement module 110 may add a common characteristic that an appearance rate is above the pre-defined threshold as a new entity for the new intent. For example, for entity candidates appearing below the pre-defined threshold, data enhancement module 110 may find a common characteristic that links multiple entity candidates. If by using a common characteristic the appearance rate is over the pre-defined threshold, data enhancement module 110 may add the common characteristic as an entity containing the examples used to build the entity. Data enhancement module 110 may use common characteristic methods including, e.g., type expansion (e.g., Dallas/Rome/Alaska→location), synonym expansion, acronym expansion, and cosine similarity calculation between each noun. In some examples, type expansion may extend to many possibilities, e.g., city, state, country, continent and location. Location may have overlap and may be chosen as an entity candidate.

In one or more embodiments, data enhancement module 110 is configured to generate a set of new training data based on the set of new intents and entities for chatbot server 104. Data enhancement module 110 may perform a test (e.g., a k-fold test or k-fold cross-validation) of the set of training data and the set of new training data. For example, k-fold cross-validation may be where a given data set is split into a K number of sections/folds where each fold is used as a testing set at some point. In the first iteration, the first fold may be used to test the model and the rest may be used to train the model. In the second iteration, 2nd fold is used as the testing set while the rest serve as the training set. This process is repeated until each fold has been used as the testing set. Data enhancement module 110 may analyze the tested results. Data enhancement module 110 may compare the testing results. Data enhancement module 110 may test the new training data against a k-fold testing algorithm to determine a validity score (needed to map to a new intent) of the new training data. Data enhancement module 110 may perform an action based on the validity score. Data enhancement module 110 may compare the test results by noting that an utterance previously resolved to a previous intent now needs to be resolved to a new intent. Data enhancement module 110 may provide a manual review indication for an utterance that does not include any entity listed. Data enhancement module 110 may automatically update the training for chatbot server 104 with the new training data when data enhancement module 110 determines the accuracy based on the testing of the new training data is maintained or improved.

Figure 2:
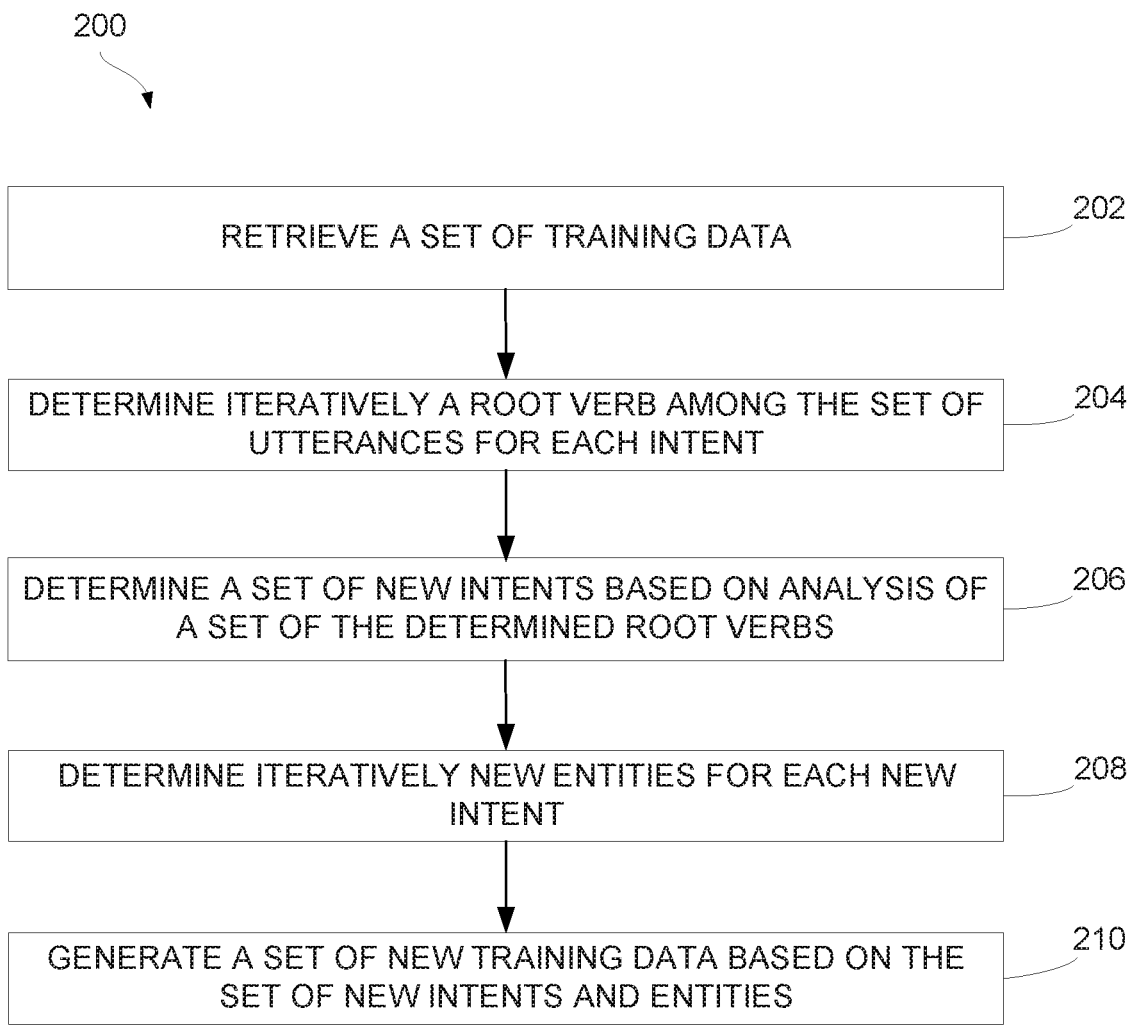
FIG. 2 is a flowchart depicting operational steps of a data enhancement module within a computing device of FIG. 1, in accordance with an embodiment of the present disclosure.

FIG. 2 is a flowchart 200 depicting operational steps of data enhancement module 110 in accordance with an embodiment of the present disclosure.

Data enhancement module 110 operates to retrieve training data 106 from chatbot server 104. Data enhancement module 110 also operates to determine iteratively a root verb among a set of utterances for each intent. Data enhancement module 110 operates to determine a set of new intents from training data 106 based on analysis of a set of the determined root verbs by performing a pairwise iteration and similarity score over the set of intents. Data enhancement module 110 operates to determine iteratively new entities for each new intent constructed based on training data 106. Data enhancement module 110 operates to generate a set of new training data based on the set of new intents and entities for chatbot server 104.

In step 202, data enhancement module 110 retrieves training data 106 from chatbot server 104. Training data 106 may include a set of intents, a set of entities, and a set of utterances for each intent that map to each intent. For example, training data 106 can be a set of training data D (D1, D2, . . . , Dn) with entities E (E1, E2, . . . , En) used to determine intents I (I1, I2, . . . , In) wherein the each training data Di is a set of utterances Ui (Ui1, Ui2, . . . , Uik) for each Ii. Data enhancement module 110 may retrieve the set of intents from the set of training data. Data enhancement module 110 may take all utterances in each intent Ii and figure out a root verb to represent the intent's utterances. Data enhancement module 110 may identify intents and entities from utterances in training data 106. Data enhancement module 110 may iteratively identify a set of utterances from the set of training data that map to each intent Ii.

In step 204, data enhancement module 110 iteratively determines a root verb among a set of utterances for each intent. Data enhancement module 110 may take all utterances associated with each intent Ij and figure out a root verb to represent the intent's utterances. Data enhancement module 110 may perform part-of-speech tagging of each utterance. In an example, part-of-speech tagging, also called grammatical tagging, may be the process of marking up a word in a text (corpus) as corresponding to a particular part of speech, based on both definition and context of the speech. Data enhancement module 110 may stem every verb in each utterance. Data enhancement module 110 may declare the root verb based on a frequency score over a pre-defined threshold. For example, data enhancement module 110 may declare a verb with highest frequency score as the root verb. The frequency score can just be "most frequent verb". When the frequency score of a verb is above a pre-defined threshold (e.g., 50% of all verbs in the intent), the verb may be selected as the root verb. If no verb scores above the threshold, data enhancement module 110 may look up word embedding vector for each verb. Data enhancement module 110 may determine the verb as the root verb that has the highest sum of the verb's word embedding vector to see which one is the most meaningful. In one or more embodiments, data enhancement module 110 may analyze iteratively (e.g., j=1 . . . n) the set of training data Dj that map to the intent Ij by determining a root verb Vj and a set of entities Ej (Ej1, Ej2, ..., Ejm). The training data Dj may be a set of utterances Uj (Uj1, Uj2, ..., Ujk) for each Ij. Data enhancement module 110 may count verbs in the training data Dj. Responsive to identifying a first verb exceeding a verb frequency threshold, data enhancement module 110 may determine the first verb exceeding the frequency threshold as the root verb. Responsive to identifying an absence of the first verb exceeding the verb frequency threshold, data enhancement module 110 may derive the root verb Vj from corresponding word embedding vectors. In an example, data enhancement module 110 may compute a similarity (e.g., cosine similarity) between the root verb Vj and the previous root verbs V1 ... j−1.

In step 206, data enhancement module 110 determines a set of new intents from training data 106 based on analysis of a set of the determined root verbs by performing a pairwise iteration and similarity score over the set of intents. Data enhancement module 110 may form a new intent by determining the similarity score among two or more existing intents exceeds a pre-defined threshold. Data enhancement module 110 may keep the root verb as a new intent if the similarity score among two or more existing intents exceeds the pre-defined threshold. Data enhancement module 110 may compute a similarity (e.g., cosine similarity) between each intent's root verb. Cosine similarity can be a measure of similarity between two non-zero vectors of an inner product space. Cosine similarity may be defined to equal the cosine of the angle between the two non-zero vectors, which is also the same as the inner product of the same vectors normalized to both have length 1. Two vectors with the same orientation have a cosine similarity of 1, two vectors oriented at 90° relative to each other have a similarity of 0, and two vectors diametrically opposed have a similarity of −1, independent of the vectors' magnitude. Data enhancement module 110 may associate utterances mapped to the two or more existing intents with the similarity score to the new intent. Data enhancement module 110 may remove the two or more existing intents with the similarity score from the set of new intents. Responsive to completion of the pairwise iteration, data enhancement module 110 may keep the remaining intents to the set of new intents. For example, data enhancement module 110 may form a new intent NewIk if the similarity score between intents Ii and Ij exceeds a pre-defined threshold. The new intent NewIk may keep the root verb from intents Ii and Ij. NewIk may get the combined utterance set from intents Ii and Ij. Ii and Ij may be removed from the existing intent set I. After the iteration is complete, any remaining intents in the existing intent set I may be added to the new intent set NewI. In one or more embodiments, data enhancement module 110 may analyze iteratively the set of training data Dj that map to the intent Ij for the root verb Vj and the set of entities Ej (Ej1, Ej2, ..., Ejm) and utilize a first similarity scoring against the V1 ... j−1 (V1, V2, ..., Vj−1) to identify a new intent I'j and a second similarity scoring against the entities E1,j−1 (E1, E2, ..., Ej−1) to identify a new entity E'j.

In step 208, data enhancement module 110 determine iteratively new entities for each new intent constructed based on training data 106. Data enhancement module 110 may remove pronouns from the set of utterances for each new intent. Data enhancement module 110 may count noun candidates for the set of utterances for each new intent. Data enhancement module 110 may build a frequency score for each noun based on how often a noun appears in the set of utterances for each new intent. Data enhancement module 110 may determine a noun with a frequency score above a pre-defined threshold as a new entity for the new intent. For example, [9,0,1] may represent a frequency score for an entity that occurs in nine utterances for NewI_1, zero in NewI_2, and once in NewI_3. In an example, a pre-defined threshold may be defined that a noun appears only in one new intent. The noun may be selected as a new entity for the new intent. In another example, a pre-defined threshold may be defined that a noun appears over a certain percentage (e.g., 75%) of time in a single new intent. The noun with the frequency score over the certain percentage of time in the single new intent may be determined as a new entity for the new intent. Data enhancement module 110 may add a common characteristic that an appearance rate is above the pre-defined threshold as a new entity for the new intent. For example, for entity candidates appearing below the pre-defined threshold, data enhancement module 110 may find a common characteristic that links multiple entity candidates. If by using a common characteristic the appearance rate is over the pre-defined threshold, data enhancement module 110 may add the common characteristic as an entity containing the examples used to build the entity. Data enhancement module 110 may use common characteristic methods including, e.g., type expansion (e.g., Dallas/Rome/Alaska→location), synonym expansion, acronym expansion, and cosine similarity calculation between each noun. In some examples, type expansion may extend to many possibilities, e.g., city, state, country, continent and location. Location may have overlap and may be chosen as an entity candidate.

In step 210, data enhancement module 110 generates a set of new training data based on the set of new intents and entities for chatbot server 104. Data enhancement module 110 may perform a testing (e.g., k-folds testing) of the set of training data and the set of new training data. Data enhancement module 110 may analyze the tested results. Data enhancement module 110 may compare the testing results. Data enhancement module 110 may test the new training data against a k-fold testing algorithm to determine a validity score (needed to map to a new intent) of the new training data. Data enhancement module 110 may perform an action based on the validity score. Data enhancement module 110 may compare the test results by noting that an utterance previously resolved to a previous intent now needs to be resolved to a new intent. Data enhancement module 110 may provide a manual review indication for an utterance that does not include any entity listed. Data enhancement module 110 may automatically update the training for chatbot server 104 with the new training data when data enhancement module 110 determines the accuracy based on the testing of the new training data is maintained or improved.

Figure 3:
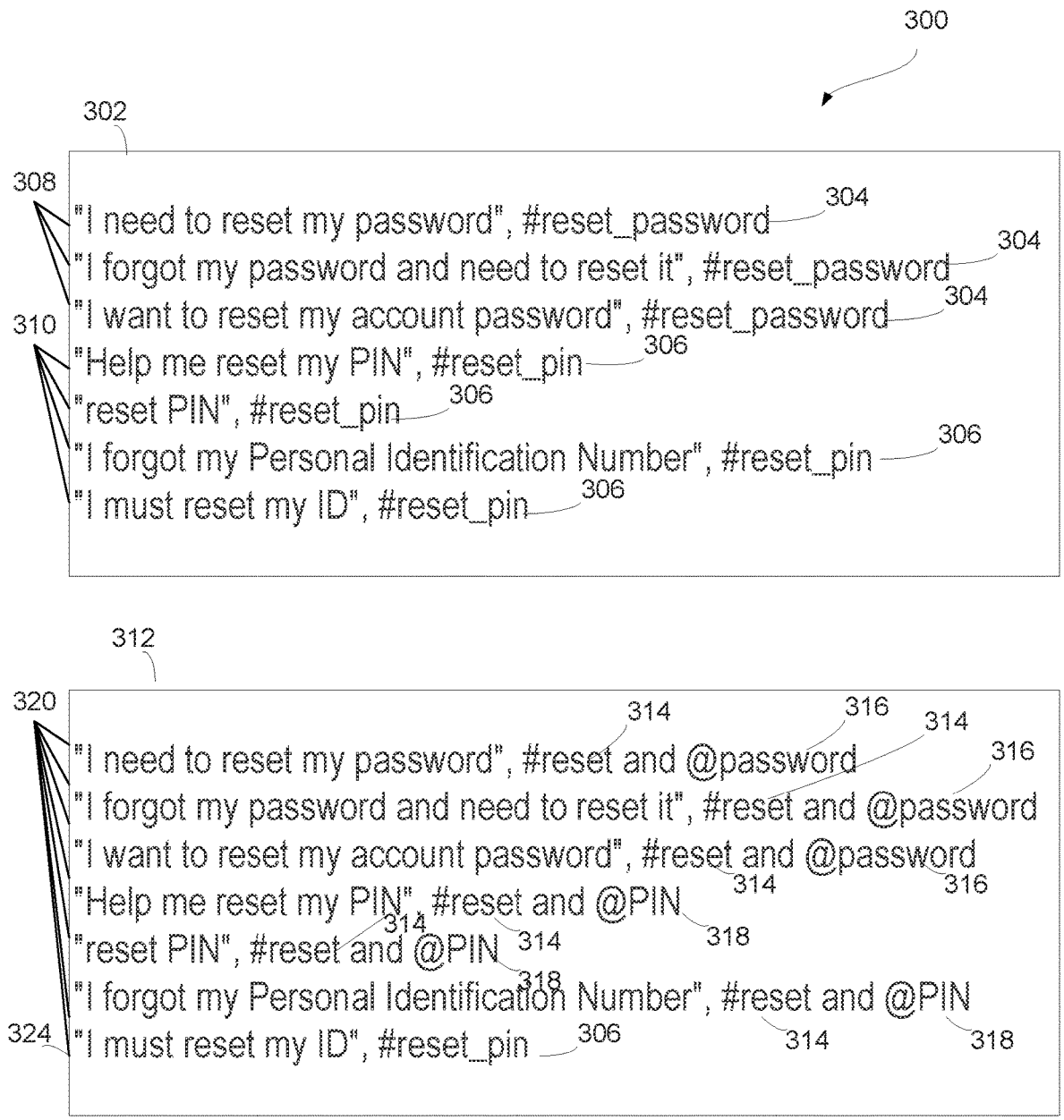
FIG. 3 is an example illustrating determining new intents and entities with the data enhancement module within the computing device of FIG. 1, in accordance with an embodiment of the present disclosure.

FIG. 3 is an example 300 illustrating determining new intents and entities with data enhancement module 110, in accordance with an embodiment of the present disclosure.

In the example of FIG. 3, a set of original training data 302 includes several intents (not shown) and two intents #reset_password 304 and #reset_pin 306 for similar password resets. Data enhancement module 110 may determine "reset" as a root verb for both two intents #reset_password 304 and #reset_pin 306. Data enhancement module 110 may combine the common verb "reset" as a new intent. Intents #reset_password 304 and #reset_pin 306 are combined to new intent #reset 314 in the set of new training data 312. Data enhancement module 110 may associate both utterances 308 and utterances 310 in the original training data 302 to new intent #reset 314 in the new training data 312 with utterances 320. Data enhancement module 110 may extract the following entity candidates: "password", "account", "PIN", "Personal", "Identification", "Number", and "ID". As data enhancement module 110 determines "password" occurs in 100% of intent #reset_password 304 and never anywhere else, data enhancement module 110 promotes "password" as an entity @password 316 for new intent #reset 314 in the new training data 312. "PIN" occurs in 75% of #reset_pin 306 and never anywhere else (twice directly and once with acronym expansion). Data enhancement module 110 may promote "PIN" as an entity @pin 318 with examples "PIN", "Personal Identification Number" for new intent #reset 314 in the new training data 312. The other nouns only appear once and have no common characteristics. The other nouns do not become entity candidates. The new training data 312 includes intent #reset 314 and entities @password 316 and @pin 318. Last utterance 324 contains no entity and may be marked for a manual review (a user may add "ID" as a synonym for "PIN".)

Figure 4:
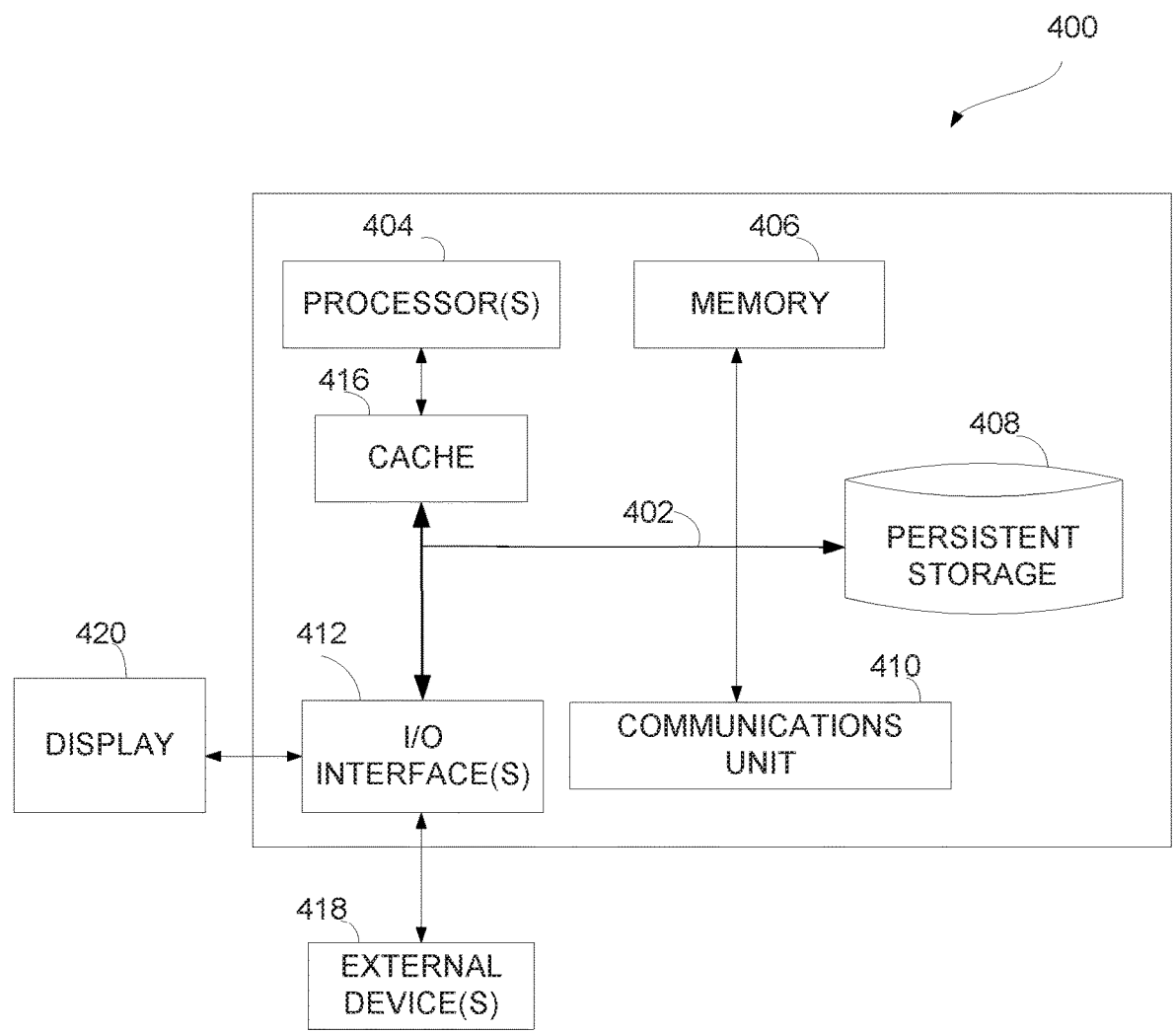
FIG. 4 is a block diagram of components of the computing device and a chatbot server of FIG. 1, in accordance with an embodiment of the present disclosure.

FIG. 4 depicts a block diagram 400 of components of computing device 102 and chatbot server 104 in accordance with an illustrative embodiment of the present disclosure. It should be appreciated that FIG. 4 provides only an illustration of one implementation and does not imply any limitations with regard to the environments in which different embodiments may be implemented. Many modifications to the depicted environment may be made.

Computing device 102 and chatbot server 104 may include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Data enhancement module 110 may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Data enhancement module 110 may be downloaded to persistent storage 408 through communications unit 410.

I/O interface(s) 412 allows for input and output of data with other devices that may be connected to computing device 102 and chatbot server 104. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., data enhancement module 110 can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
updating, by one or more processors, a training for a chatbot with new training data derived from a set of training data, wherein updating comprises:
retrieving, by one or more processors, the set of training data from the chatbot, wherein the set of training data includes a set of intents, a set of entities, and a set of utterances that map to each intent;
determining iteratively, by one or more processors, a root verb among the set of utterances for each intent, comprising:
responsive to the root verb failing to exceed a verb frequency threshold, identifying, by one or more computer processors, one or more embedding vectors for the root verb based on a computed cosine similarity between the root verb and one or more previous root verbs, wherein the computed cosine similarity a measure of similarity between two or more embedding vectors of an inner product space; and
determining, by one or more computer processors, a second root verb associated with a highest sum of embedding vectors;

determining, by one or more processors, a set of new intents based on analysis of the second root verb by performing a pairwise iteration and similarity score over the set of intents;

determining iteratively, by one or more processors, one or more new entities for each new intent; and generating, by one or more processors, the new training data based on the set of new intents and new entities.

2. The computer-implemented method of claim 1, wherein determining the root verb comprises:

performing part of speech tagging of each utterance;

stemming every verb in each utterance; and declaring the root verb based on a frequency score over a pre-defined threshold.

3. The computer-implemented method of claim 1, wherein the similarity score is based on computing similarity between each intent's root verb.

4. The computer-implemented method of claim 1, wherein generating the set of new intents comprises:

forming a new intent by determining the similarity score among two or more existing intents exceeds a pre-defined threshold;

associating utterances mapped to the two or more existing intents with the similarity score to the new intent;

removing the two or more existing intents with the similarity score from the set of new intents; and responsive to completion of the pairwise iteration, keeping a remaining intents to the set of new intents.

5. The computer-implemented method of claim 1, wherein determining the one or more new entities for each new intent comprises:

removing pronouns from the set of utterances for each new intent;

building a frequency score for each noun based on how often the respective noun appears in the set of utterances for each new intent; and determining a noun with a frequency score above a pre-defined threshold as an entity for the new intent.

6. The computer-implemented method of claim 1, wherein determining the one or more new entities for each new intent comprises adding a common characteristic that an appearance rate is above a pre-defined threshold as an entity for the new intent.

7. The computer-implemented method of claim 1, further comprising:

performing, by one or more processors, a test of the set of training data;

performing, by one or more processors, a test of the set of new training data; and comparing, by one or more processors, the testing result.

8. A computer program product comprising:

one or more computer readable storage media, and program instructions collectively stored on the one or more computer readable storage media, the program instructions comprising:

program instructions to update training for a chatbot with new training data derived from a set of training data, wherein updating comprises:

program instructions to retrieve the set of training data from the chatbot, wherein the set of training data includes a set of intents, a set of entities, and a set of utterances that map to each intent;

program instructions to retrieve a set of training data including a set of intents, a set of entities, and a set of utterances that map to each intent;

program instructions to determine iteratively a root verb among the set of utterances for each intent, wherein the program instructions comprise:

program instructions to, responsive to the root verb failing to exceed a verb frequency threshold, identify one or more embedding vectors for the root verb based on a computed cosine similarity between the root verb and one or more previous root verbs, wherein the computed cosine similarity a measure of similarity between two or more embedding vectors of an inner product space; and program instructions to determine a second root verb associated with a highest sum of embedding vectors;

program instructions to determine a set of new intents based on analysis of the second root verb by performing a pairwise iteration and similarity score over the set of intents;

program instructions to determine iteratively one or more new entities for each new intent; and program instructions to generate a set of new training data based on the set of new intents and new entities.

9. The computer program product of claim 8, wherein program instructions to determine iteratively a root verb comprise:

program instructions to perform part of speech tagging of each utterance;

program instructions to stem every verb in each utterance; and program instructions to declare the root verb based on a frequency score over a pre-defined threshold.

10. The computer program product of claim 8, wherein the similarity score is based on computing similarity between each intent's root verb.

11. The computer program product of claim 8, wherein program instructions to generate the set of new intents comprise:

program instructions to form a new intent by determining the similarity score among two or more existing intents exceeds a pre-defined threshold;

program instructions to associate utterances mapped to the two or more existing intents with the similarity score to the new intent;

program instructions to remove the two or more existing intents with the similarity score from the set of new intents; and program instructions, responsive to completion of the pairwise iteration, to keep a remaining intents to the set of new intents.

12. The computer program product of claim 8, wherein program instructions to determine the one or more new entities for each new intent comprise:

program instructions to remove pronouns from the set of utterances for each new intent;

program instructions to build a frequency score for each noun based on how often the respective noun appears in the set of utterances for each new intent; and program instructions to determine a noun with a frequency score above a pre-defined threshold as an entity for the new intent.

13. The computer program product of claim 8, wherein program instructions to determine the one or more new entities for each new intent comprise program instructions to add a common characteristic that an appearance rate is above a pre-defined threshold as an entity for the new intent.

14. The computer program product of claim 8, further comprising:
- program instructions, stored on the one or more computer-readable storage media, to perform a test of the set of training data;
- program instructions, stored on the one or more computer-readable storage media, to perform a test of the set of new training data; and
- program instructions, stored on the one or more computer-readable storage media, to compare the testing result.

15. A computer system comprising:
- one or more computer processors, one or more computer readable storage media, and program instructions stored on the one or more computer readable storage media for execution by at least one of the one or more computer processors, the program instructions comprising:
- program instructions to update training for a chatbot with new training data derived from a set of training data, wherein updating comprises:
  - program instructions to retrieve the set of training data from the chatbot, wherein the set of training data includes a set of intents, a set of entities, and a set of utterances that map to each intent;
  - program instructions to determine iteratively a root verb among the set of utterances for each intent, wherein the program instructions comprise:
    - program instructions to, responsive to the root verb failing to exceed a verb frequency threshold, identify one or more embedding vectors for the root verb based on a computed cosine similarity between the root verb and one or more previous root verbs, wherein the computed cosine similarity a measure of similarity between two or more embedding vectors of an inner product space; and
    - program instructions to determine a second root verb associated with a highest sum of embedding vectors;
  - program instructions to determine a set of new intents based on analysis of the second root verb by performing a pairwise iteration and similarity score over the set of intents;
  - program instructions to determine iteratively one or more new entities for each new intent; and
  - program instructions to generate the new training data based on the set of new intents and new entities.

16. The computer system of claim 15, wherein program instructions to determine iteratively a root verb comprise:
- program instructions to perform part of speech tagging of each utterance;
- program instructions to stem every verb in each utterance; and
- program instructions to declare the root verb based on a frequency score over a pre-defined threshold.

17. The computer system of claim 15, wherein the similarity score is based on computing similarity between each intent's root verb.

18. The computer system of claim 15, wherein program instructions to generate the set of new intents comprise:
- program instructions to form a new intent by determining the similarity score among two or more existing intents exceeds a pre-defined threshold;
- program instructions to associate utterances mapped to the two or more existing intents with the similarity score to the new intent;
- program instructions to remove the two or more existing intents with the similarity score from the set of new intents; and
- program instructions, responsive to completion of the pairwise iteration, to keep a remaining intents to the set of new intents.

19. The computer system of claim 15, wherein program instructions to determine the one or more new entities for each new intent comprise:
- program instructions to remove pronouns from the set of utterances for each new intent;
- program instructions to build a frequency score for each noun based on how often the respective noun appears in the set of utterances for each new intent; and
- program instructions to determine a noun with a frequency score above a pre-defined threshold as an entity for the new intent.

20. The computer system of claim 15, wherein program instructions to determine the one or more new entities for each new intent comprise program instructions to add a common characteristic that an appearance rate is above a pre-defined threshold as an entity for the new intent.

* * * * *